June 19, 1928.
G. B. RIDLEY
1,674,414
FRUIT DRIER
Original Filed April 11, 1927  2 Sheets-Sheet 2
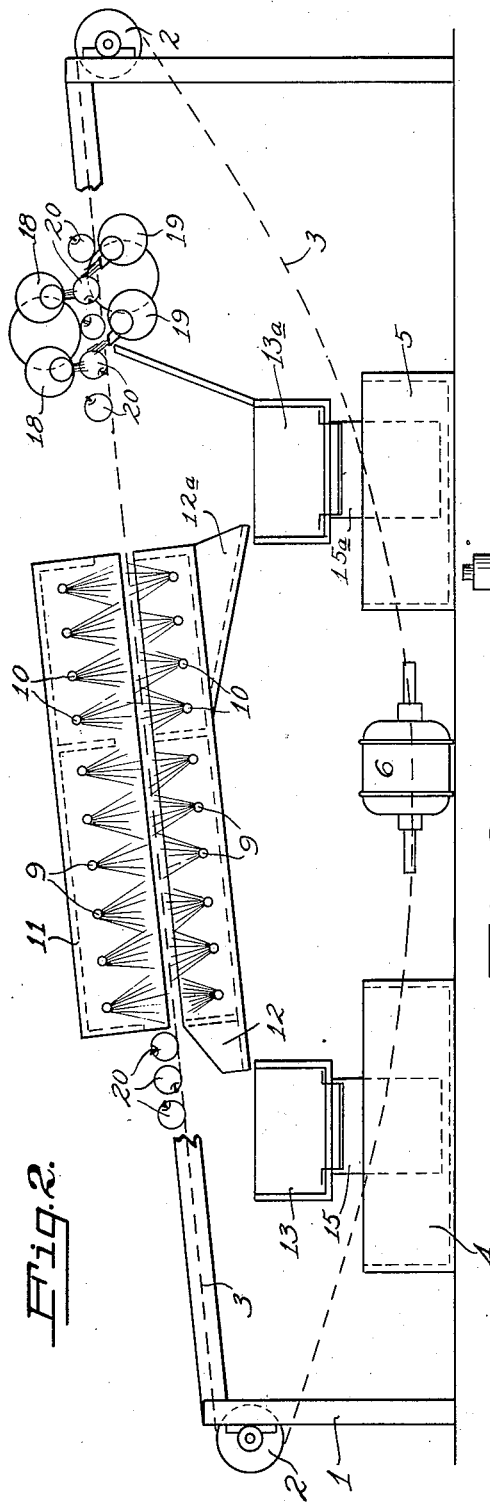
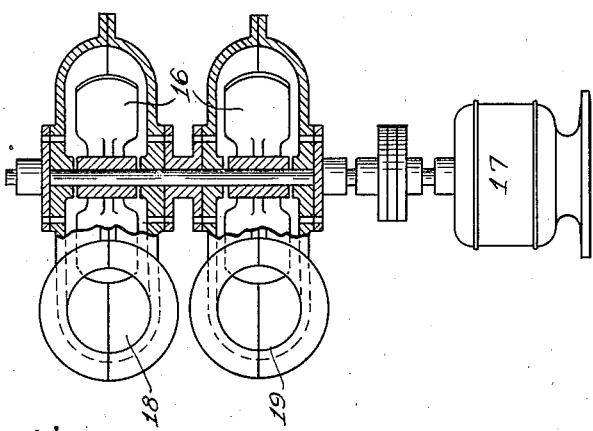
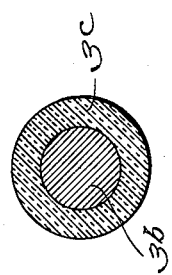
INVENTOR.
Grahame Burke Ridley
BY Burth & Burth
ATTORNEYS.

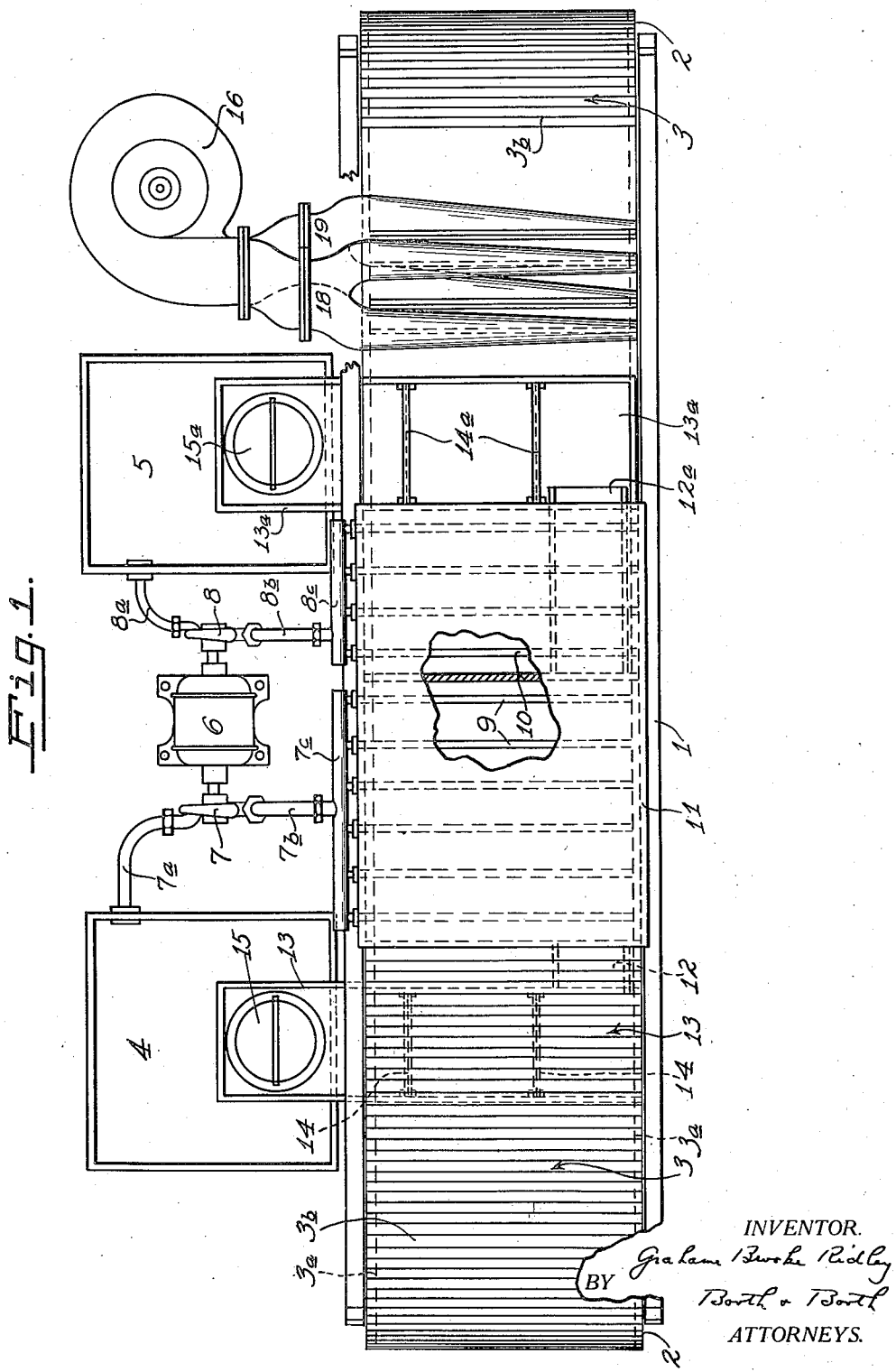

Patented June 19, 1928.

1,674,414

UNITED STATES PATENT OFFICE.

GRAHAME BROOKE RIDLEY, OF SAN FRANCISCO, CALIFORNIA, ASSIGNOR TO BEAN SPRAY PUMP CO., OF SAN JOSE, CALIFORNIA, A CORPORATION OF CALIFORNIA.

FRUIT DRIER.

Original application filed April 11, 1927, Serial No. 182,931. Divided and this application filed October 29, 1927. Serial No. 229,678.

This application is a division of my pending application, Serial Number 182,931, filed April 11th, 1927, for a patent for fruit-washers.

My invention relates to the class of fruit driers. It is especially intended for use in connection with washers in which the fruit has been previously subjected to a cleansing liquid or liquids and from the surface of which the clinging moisture must be removed in order to dry it.

It is in this connection I have disclosed my drier in the pending application above referred to and from which this application is divided; and, in order to now disclose herein the utility of my drier in its highest development I will repeat the previous disclosure in such detail as may be necessary, but shall confine my claims to the drier per se.

The object of my present invention is to dry the surface of the fruit; and to this end it comprises an open-work conveyer to support the fruit substantially stationary upon its surface while carrying it forward and means for directing upon the fruit, both from above and below, during its progress, jets of air under a pressure velocity adapted to bodily blow from its surface any moisture thereon, the positional relation of the upper and lower jets being such as to remove approximately all the moisture from all portions of the surface and blow it in a direction away from the fruit to prevent its reprecipitation upon the surface from which it is blown.

In the accompanying drawings, I have illustrated my drier in connection with a washer, in order to indicate one source of the surface moisture which it is the special object of my drier to remove.

Fig. 1 is a top plan.

Fig. 2 is a side view, broken, and chiefly diagrammatic.

Fig. 3 is a view of a double fan and motor for generating the air jets.

Fig. 4 is a cross section enlarged of one of the conveyer rods.

1 is a frame, in which are mounted terminal sprocket-rolls 2 over which passes an endless traveling conveyer 3, to which motion is imparted by any suitable drive, as for example by the inleading of power through the head roll. The conveyer 3 comprises side chains $3^a$, and cross rods $3^b$ spaced apart and covered with rubber $3^c$, said rods, by their spaced relation, providing for the necessary open-work support for the fruit, freely permeable to the several fluid agencies used. At one side of the frame is a tank 4 for acid, followed by a second tank 5 for water.

6 is a motor, adapted to drive, on one side, a pump 7, the suction pipe $7^a$ of which leads from the acid tank 4, and on the other side it drives a pump 8, whose suction pipe $8^a$ leads from the water tank 5.

The delivery pipe $7^b$ from the pump 7 has a header-pipe $7^c$ which carries a plurality of spray pipes 9 in double series, the upper series transversely overlying the conveyer 3 and adapted to discharge the sprays downwardly, and the lower series transversely underlying the conveyer and adapted to spray upwardly, as shown in Fig. 2. In similar arrangement, the delivery pipe $8^b$ from the pump 8 has a header $8^c$ with a double series of spray pipes 10 overlying and underlying the conveyer. The spray pipe zone is boxed in by a casing 11, from one end of which leads a spout 12 which empties into a trough 13, provided with plural, separately removable, spaced screens 14, said trough discharging through a spout 15 into the acid tank 4. In like manner, the casing 11 has, at its other end, a spout $12^a$ which empties into a trough $13^a$ with spaced screens $14^a$, said trough discharging through a spout $15^a$ into the water tank 5. Thus a circulating system is provided by which the cleansing liquids may be screened and used repeatedly, the double screens permitting the removal of accumulated débris without stopping the operation.

16 is a pair of fans, driven by a motor 17. One of these fans delivers to an air jet-member 18 transversely overlying the conveyer belt 3 and the other fan delivers to an air-jet member 19 underlying said conveyer crosswise. These air-jet members may be single or plural, here shown as double, and they are tapered in order to maintain constant velocity throughout their length. They lie in close proximity to and immediately succeed the water spraying zone or region. They are arranged with relation to the belt in such wise as to secure the maximum functional effect of the jets. Specifically, though not essentially, such effect is secured by so placing the upper jet member that it discharges downward at 90° to the belt, the lower jet member discharging upwardly at 45°, and in a direction backwardly against the advance of the belt, the arrangement being such that both upper and lower jets are tangent to the fruit at the same time, as said fruit is leaving the center lines of the jet.

To facilitate the installation of the machine in conjunction with other equipment, already more or less standardized, it is advisable to discharge the fruit from the machine at a greater elevation than that at which it is loaded. In order to do this, the conveyer is inclined a suitable amount, so that the fruit is raised to the discharge end without being disturbed.

The process carried out in this machine is as follows:—

The fruit indicated by 20 in Fig. 2 is placed upon the lower end of the conveyer, and rests substantially stationary upon its surface by minimum contact, due to the cylindrical section of the rods 3b, but with sufficient weight to avoid any appreciable or injurious disturbance due to the fluid jets. The special purpose for which the machine is adapted is to remove lead arsenate or other spray material from the surface of the fruit, or otherwise wash and dry it to comply with Government restrictions relating to the maximum allowable arsenic concentration on fruit marketed fresh.

The fruit is advanced through the regions of the cleansing liquids. It first passes through the acid sprays, say, for example, dilute hydrochloric acid, and then through the rinsing water sprays. These sprays reach the fruit both from above and below. While dilute hydrochloric acid is customarily used, other cleansing liquid may be used according to circumstances; and likewise, instead of using clear water for rinsing, it may sometimes be advisable to use special solution to secure certain desirable results, such, for example, as resisting mold, or facilitating the removal of surface moisture.

Immediately upon leaving the zone of the cleansing liquid, the fruit passes through the air-jet region. In this region it is subjected to the air jets under a pressure and velocity adapted to blow off bodily the cleansing liquid still clinging to it, thus drying or partially drying the fruit by the bodily, or, as it may be termed, the mechanical removal of moisture without reference and in contrast to evaporation. Thus time is saved and the machine itself may be made much shorter than if an ordinary evaporating zone were present. Also the high velocity jets reach into and as readily blow away the relatively greater volume of liquid in the cavities of the fruit, as from the other surfaces, and they will also blow out from the cavities any débris lodged therein.

The pressure required to secure the necessary velocity of the air-jets cannot, of course, be stated in exact terms. It will depend upon the nature and condition of the fruit, and of the cleansing liquids; but one can readily judge for himself by observation the most desirable pressure to blow the moisture off.

Proper positional relation of the air jet members is essential.

Capillary attraction tenaciously holds drops of water to the skin of fruit, so that when forcibly blown from the top, many of the drops follow around out of the path of the air stream and cling to the bottom of the fruit. Similarly, when blown from the bottom they gather on the top of the fruit. The rapid and practically complete removal of the liquid is, therefore, accomplished only by using a plurality of streams of air, pairs of two streams each being most efficient. One of each pair of air streams is directed from above downwardly, and the other from the bottom upwardly. When the two streams of high velocity air and the liquid carried by them, meet, capillary attraction is broken and the liquid is forced from the fruit.

There is necessarily some spatter forward upon the fruit previously dried, from the relatively larger amount of water carried on the ends of such fruit as may be turned up, as it is struck by the first upper air jet. Therefore, more than one pair of nozzles is necessary to fully dry the fruit.

It is very important, however, to limit this spattering to a minimum, by seeing that the liquid drops as forced from the fruit are not blown forward onto the fruit just ahead, which has been previously dried. This is accomplished by creating a strong air blast, which carries with it the liquid driven from the fruit back in the direction of the approaching fruit. To avoid placing additional moisture on the approaching fruit, it is also better to throw the moisture downward as well as backward.

This is readily accomplished when the air jets are placed in relation to each other as shown in Fig. 2. Air jet 18 blows downwardly from above the fruit, while air jet 19 is located below the conveyer, and forward of jet 18 with its stream of air blowing upwardly, but also backwardly towards the advancing fruit. This angle is preferably about 45°, so that air coming down on the forward side of the fruit is mostly sucked into this lower air stream and carried on around until it comes under the direct air stream from the upper jet. When these two jets of air travelling at very high velocity meet, both streams are instantly united in one, and their angle of reflection is downward, that is at an angle midway between the starting angles, and creates a veritable rainstorm. For example, if the top air nozzle is set to blow the air at 90° angle to the conveyer, and the lower nozzle at 45° then the two air currents when they strike each other will be diverted downwardly at an angle of 112½° or midway between the angles of the two nozzles. By setting the center outlet of the lower nozzle 2″ ahead of the center of the upper nozzle with angles above described, the two air currents meet at a point about 1½″ above the conveyer, which is the average center of ordinary fruit. The same result can be secured by maintaining approximately the same angle between the two air jets, but swinging both slightly forward, as around the arc of a circle, so that the top air stream would be directed slightly toward the advancing fruit. The result is not quite as good if the two angles are swung around the arc in the other direction with the top nozzle pointing slightly toward the receding fruit.

The rapid movement of the drops from the top downwardly, and at the same time from the bottom upwardly until the two meet is readily visible to the eye. Drops driven downwardly on the forward side of the advancing fruit are picked up by the lower air stream and rushed on around the bottom of the fruit and partly discharged when they contact with the rubber covered conveyer rod. However, since the force of the air current is sufficient to slightly move each piece of fruit, and because only a spot on the fruit touches the rod, most of these drops are carried on around until they meet the drops forced down on the back side of the advancing fruit. The drops from all portions of the fruit are thus discharged together and carried off in the newly directed air current. Likewise the original blasts of air, diverted downward and made wet by the drops of water taken from the fruit, strikes one's hand with appreciable force when held in position under the conveyer.

I claim:—

1. A fruit drier comprising a conveyer to receive and advance the fruit; and means for directing upon the progressing fruit from above and below, jets of air under pressure adapted to bodily blow moisture from its surface, the upper and lower jets with respect to the conveyer, being at relatively different angles.

2. A fruit drier comprising a conveyer to receive and advance the fruit; and means for directing upon the progressing fruit from above and below, jets of air under pressure adapted to bodily blow moisture from its surface, the upper and lower jets with respect to the conveyer, being at relatively different angles, adapted to blow said moisture in a direction away from the receding fruit to avoid reprecipitation upon the surface from which said moisture is blown.

3. A fruit drier comprising a conveyer to receive and advance the fruit; and means for directing upon the progressing fruit from above and below jets of air under pressure adapted to bodily blow moisture from its surface, the upper and lower jets with respect to the conveyer and to each other being at an angle adapted to direct the blown off moisture backwardly against the advance of the fruit.

4. A fruit drier comprising a conveyer to receive and advance the fruit, and means for directing upon the progressing fruit from above and below jets of air under pressure adapted to bodily blow moisture from its surface, the upper and lower jets with respect to the conveyer and to each other being at an angle adapted to direct the blown off moisture backwardly against the advance of the fruit and downwardly therefrom.

5. A fruit drier comprising a conveyer to receive and advance the fruit; and means for directing upon the progressing fruit from above and below jets of air under a pressure adapted to bodily blow moisture from its surface, the jets from one side being directed at right angles to the conveyer and those from the other side being directed at a backward angle to the conveyer.

In testimony whereof I have signed my name to this specification.

GRAHAME BROOKE RIDLEY.